Aug. 15, 1967 J. BUFFET 3,335,589
HOT WORKING OF MATERIALS
Original Filed Oct. 29, 1964

INVENTOR.
JEAN BUFFET
BY
Webb, Burden, Robinson & Webb
ATTORNEYS.

3,335,589
HOT WORKING OF MATERIALS
Jean Buffet, Versailles, France, assignor to Compagnie du Filage des Metaux et des Joints Curty, Paris, France
Original application Oct. 29, 1964, Ser. No. 408,465, now Patent No. 3,182,474, dated May 11, 1965. Divided and this application Feb. 26, 1965, Ser. No. 435,556
2 Claims. (Cl. 72—41)

This is a division of application Ser. No. 408,465, filed Oct. 29, 1964, now Patent No. 3,182,474.

This invention relates to methods of hot-working materials, particularly metal and alloys, and is chiefly concerned with the hot-working for extrusion and boring or piercing materials having high resistance to deformation, especially certain metals and alloys.

The invention is broadly applicable to the hot-working for extrusion and boring or piercing such materials, including especially high-speed steels, refractory alloys, allied steels, alloys comprising a number of phases and the compositions known as cermets and the like. Extreme difficulties have often been experience in the past when exposing such materials to hot-working processes such as extrusion, piercing, and the like, because of the deformation of cracks and similar flaws at the surface of the material during the hot-working process. A chief factor responsible for this cracking tendency has been the sudden cooling effect exerted on the surface of the heated ingot or billet by the cool surfaces of the hot-working press equipment that act thereon. Since the materials under consideration are, as a general rule, poor heat conductors, such heat is not transferred to the core of the billet rapidly enough to avert the setting up of steep thermal gradients in the material, which in turn generate high internal stresses resulting in the aforementioned cracks.

In Buffet and Meriaux prior patent application No. 646,192 of Mar. 15, 1967, now abandoned for "Method of Hot Extrusion of Metals," an improved method of hot-working brittle materials was disclosed, wherein the ingot or billet of material was encased in a readily deformable metallic case or sheath. While this prior method has constituted a noteworthy advance in the art and has permitted the hot-working of metals and other materials which were not practically amenable to such treatment in the past, it had certain disadvantages which it is the specific object of the present invention to eliminate.

The chief drawback of the earlier method just recalled (the method of application 646,192) was the fact that the hot-worked, e.g. extruded or otherwise deformed, article obtained was itself coated with a thin coating of foreign material constituted by the sheath or case deformed simultaneously with the material. The removal of this coating, by mechanical or chemical means, constituted a supplementary operation which complicated the process. Moreover, the final hot-worked article after removal of the coating was in certain cases apt to exhibit surface flaws or roughness. Also dimensional accuracy was difficult to maintain in view of the variations in thickness of the deformed case.

A broad object of this invention is to provide an improved method of hot-working of such materials which are difficult to be deformed heretofore even by hot-working. Another objpect is to provide such a method in which the final hot-worked article will be produced in a directly usable form.

The invention provides a method of hot-working, which comprises encasing a billet or ingot of the material in a case or sheath having somewhat larger inner dimensions than the outer dimensions of the billet to define clearance space therewith, interposing in said space a mass of lubricant substance so selected as to have substantial viscosity in the range of desired hot-working temperatures, heating the billet and case to said desired range, placing the heated cased billet into a press chamber having wall surfaces closely surrounding the case, and applying hot-working pressure to the billet but not the case in the chamber so as to form a hot-worked article from said billet, which article slides along the major portion of the case or sheath during deformation, while said case or sheath remains in position in the press chamber without being substantially deformed.

Owing to the presence of the heated sheath encasing the material, the latter will be effectively protected from rapid cooling from the hot-working tooling equipment acting thereon, and will therefore not tend to develop cracks or other defects but will deform smoothly and uniformly throughout. Furthermore, the provision of a layer of viscous lubricant material (e.g. glass) between the material and its case will enable the material to be readily separated from the case on, or after, being subjected to the desired hot-working step. Thus, where the method is applied to a hot extrusion process for example, extruding pressure can be applied only to the billet but not to the surrounding case or sheath, so that only the billet will be extruded out of the extrusion chamber through the usual die plate orifice while the case will remain in the chamber.

It will be understood that the word "billet" as used herein and in the claims serves to designate any body of the material to be hot-worked, such as a cast ingot for example, in the form in which it is to be subjected to the hot-working operation.

The lubricant substance may be any substance selected so as to exhibit substantial viscosity in the range of temperatures to which the material is to be exposed. Where the material is metallic, the lubricant substance is suitably vitreous in character, e.g. powder glass.

The billet and its case or sheath may be heated simultaneously with the former encased in the latter, or billet and sheath may be heated separately and the heated billet encased in the heated sheath.

The above and further features and advantages of the invention will stand out clearly from the ensuing description, made with reference to the accompanying diagrammatic drawings, given by way of illustration but not of limitation, and wherein.

Figure 1:
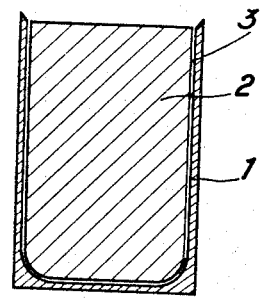
FIG. 1 shows in vertical section a billet encased in a sheath according to one form of embodiment of the invention.

Referring first to FIG. 1, a billet 2 made from an alloy that is difficult to work is surrounded by a case or sheath 1, the walls of which are spaced from the surfaces of the billet so as to provide a substantially uniform clearance space, say of about 1 mm. in width, in which a coat of suitable lubricant substance 3 is interposed. The lubricant 3 may be any suitable substance having sufficient viscosity in the working temperature range so as not to flow out during the working process, and is preferably a substance of vitreous character, e.g. powdered glass. The lubricant coast or layer 3 may be provided by any suitable method, e.g. it may be spray-coated over the surface of the billet and/or the sheath 1.

Figure 2:
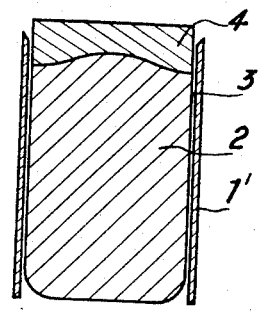
FIG. 2 is a similar view relating to a modified embodiment.

In the modified embodiment illustrated in FIG. 2, the case or sheath 1' is open at both ends. Moreover, the billet 2 is shown as having a plug or disk 4 of some suitable inexpensive metal overlying its upper end in order to avert losing valuable alloys at the end of the billet to be engaged by the extrusion punch or equivalent pressure means.

Figure 3:
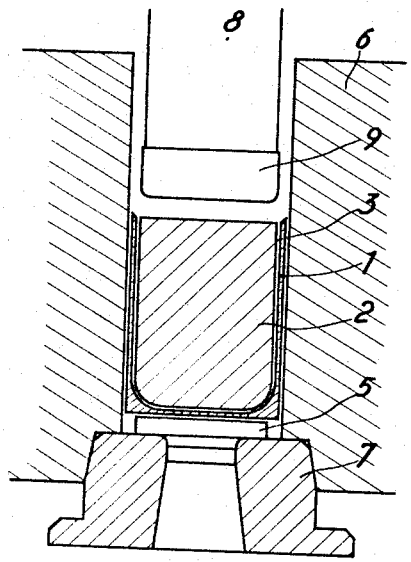
FIG. 3 illustrates an encased billet of the kind shown in FIG. 1 placed in position in the extrusion chamber of a suitable extrusion press, adjacent parts of which are diagrammatically shown, before beginning of the actual extrusion process.

The composite assembly comprising the case 1 or 1', lubricant 3 and billet 2, of either of the forms shown in FIGS. 1 and 2, is heated to a suitable extrusion temperature, and is then placed into the container 6 of a conventional extrusion press, as shown in FIG. 3. Alternatively, the billet 2 and case 1 or 1' may be heated separately before assembly. In this example the extrusion press comprises a dieplate member 7 positioned at the base of the container and having an extrusion orifice therein, and a plunger or punch 8 penetrating into the container from the upper end of it and slidable in the container. A disk-shaped plug of lubricant material 5 is positioned atop the die plate 7 according to usual procedure to facilitate the initial operation. The punch 8 is fitted with a dummy block 9 having a diameter just smaller than the inner diameter of case 1.

Figure 4:
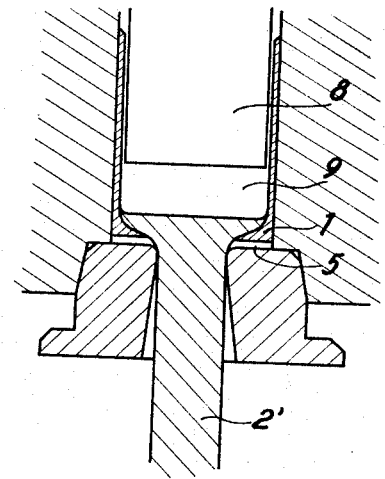
FIG. 4 is a view similar to FIG. 3 towards the end of the extrusion process.

In operation, when pressure is applied to the upper end of punch 8 with conventional press mechanism not shown, the punch end piece 9 engages the upper surface of billet 2 within the case 1 and forces the billet through the bottom wall of the case and through the die plate, as shown in FIG. 4, to provide the extruded product at 2'. The case 1 itself remains in the container and is not forced out.

In one practical embodiment of the invention, described by way of illustration, a billet was prepared from precipitation-hardened nickel-cobalt-molybdenum alloy, a material which is found to be impossible to extrude by conventional methods without cracking. The composition of this alloy was:

| | Percent |
|---|---|
| C | 0.15 |
| Mn | 0.75 |
| Si | 0.75 |
| Cr | 20 |
| Co | 13 |
| Mo | 4 |
| Ti | 3 |
| Al | 2.75 |
| Fe | 4 |
| Ni | Balance |

The billet, 56 mm. in diameter and 80 mm. long, was spray-coated with powdered sheet glass over its outer surface, and was placed into a mild-steel case of 57 mm. inner diameter and 60.5 mm. outer diameter. The assembly was heated in an electric furnace to a temperature of 1,050° C. A die plate of 27 mm. orifice diameter was used. The inner diameter of the container was 62 mm., and the extrusion punch was fitted with an end piece 9 which was 57 mm. in diameter. A disk of sintered sheet glass powder about 4 mm. deep was placed on top of the die plate.

The resulting extruding article was found to be entirely free of cracks.

The method of the invention was further used to hot pierce holes in alloys of the type having a general composition Ni 20%, Cr, 20%, Co, 20%, balance, iron. Billets 185 mm. in diameter and 480 mm. long were formed from this alloy, spray-coated with a suspension of powdered sheet glass, and inserted into a sheath of mild steel 187 mm. inner diameter and 207 outer diameter, and heated to a temperature of 1100° C. in an electric furnace. The heated assembly was then placed into the container of a vertical piercing press to have a 110 mm. dia. hole pierced therein. The inner diameter of the container was 210 mm. The piercing press used in this example was of the general type disclosed in the prior patent application of Jean Buffet and Joseph Meriaux No. 592,849 of June 21, 1956 for "Method of Boring Metals" (now Patent No. 2,956,337).

Figure 5:
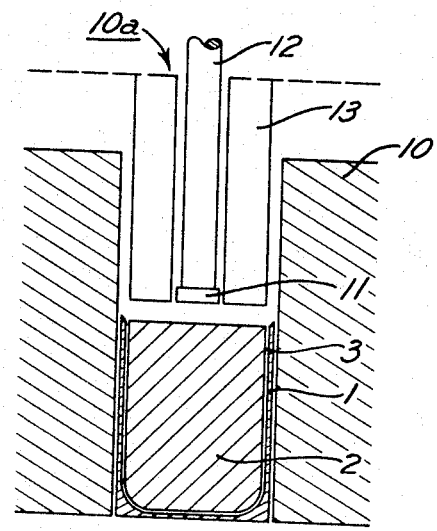
FIG. 5 is a fragmentary vertical section view showing the billet of FIG. 1 disposed in apparatus for hot piercing same.
Figure 6:
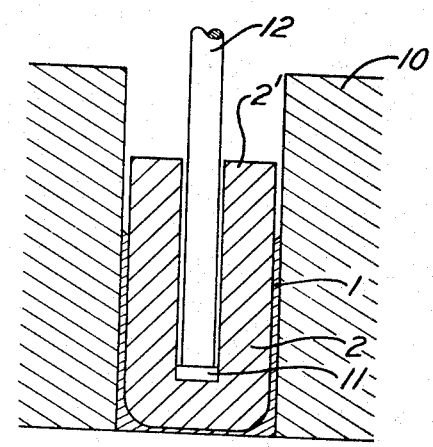
FIG. 6 is a view similar to FIG. 5 showing the billet of FIG. 5 during the piercing operation.

Referring to FIGURES 5 and 6 the composite assembly of FIGURE 1 comprising the case 1, lubricant 3 and billet 2 is heated without any particular precautions to a required piercing temperature (about 1000° C.), and thereafter the assembly is placed in a container 10 of a hot piercing press 10a. A piercing head 11 is placed at the end of a main piercing punch 12. The diameter of the head 11 is slightly greater than that of the main punch 12, and is equal to that of the bore which is to be pierced in the billet 2.

The main punch 10 is surrounded by a secondary punch 13 the outer diameter of which is slightly smaller than the inner diameter of case 1 and the inner diameter of which is slightly greater than that of the piercing head 11.

A pressing force is first applied to the main punch 10 and the secondary punch 12 simultaneously so that a compression of the billet 2 results whereby the diameter of the case 1 slightly increases to eliminate the clearance between case 1 and container 10 while the length of the case 1 remains substantially the same.

The total pressing force is then applied to the main punch 12 to effect piercing of the billet 2 during which the upper face thereof rises up to or moves rearwardly to position 2'. Also, during piercing the lubricant 3 favors sliding of the billet along the inner surface of the case 1, the shape of which remains unchanged (FIGURE 6).

As previously stated the case or sheath 1 is found to exert an effective protective action upon the outer surface of the billet, so that there is no sudden cooling of this surface on contact with the walls of the container, die and punch member, or similar hot-working tooling components. As a result, there are no steep temperature gradients set up in the material, and the latter is thus able to deform smoothly and uniformly throughout its mass without any tendency to develop cracks.

As mentioned earlier the billet 2 may first be inserted into the case 1 or 1' together with the lubricant layer, and the assembly may be bodily heated to the desired temperature, or alternatively the billet and case may be separately heated and the heated billet inserted into the heated case; in this latter procedure it is found advisable to provide a somewhat larger clearance space between the surfaces of the billet and the case, e.g. about 2 or 3 mm.

In order to ensure more positively that the case will be retained within the container, in the deformation processes of the general types described above, it may be desirable to subject the outer surface of the case 1 to a treatment that will increase its adhesion to the surrounding wall surfaces of the container. This may be done by merely omitting any lubrication whatever between the case and container, and/or by oxidizing the outer surface of the case as by heating in an oxidizing atmosphere.

Further, in the extrusion process, means, not illustrated in FIGURES 3 and 4 may desirably be provided for centering the pressure member 8, or the dummy block 9 of it, within the container in order to guide the said terminal part relatively to the case 1 and encased billet 2, and ensure that pressure is applied to the latter rather than the former. Such guide means may assume the form of a centering ring surrounding the pressure member and slidable with respect to it or/and to the container.

Various other modifications may be made in the structural details illustrated and described, and the invention may be applied for hot-working processes as well as to materials other than those specifically mentioned.

While I have shown and described preferred embodiments of my invention, it may be otherwise embodied within the scope of the appendant claims.

What I claim is:

1. A method of hot piercing material selected from the group consisting of steels, alloy steels, refractory alloys and cermets, which comprises encasing a billet of said material in a sheath so that there is a clearance space between said billet and said sheath, said sheath being made of a rigid material, interposing in said clearance space a substance selected from within the group of substances having a substantial viscosity in the range of temperatures including the desired hot piercing temperature of said billet, heating said billet, said sheath and said substance to a desired hot piercing temperature of said billet, placing said heated billet and its sheath into a press chamber of a piercing press having a piercing nose of a desired piercing diameter adapted to engage locally said billet at one end thereof, and piercing said billet by application of piercing pressure by said nose directly to said billet but not to said sheath thereby causing said material of said billet to flow rearwardly in said press chamber while said sheath remains in position in said press chamber.

2. The method of claim 1 characterized by said sheath being made of a mild steel.

References Cited

UNITED STATES PATENTS

| | | | |
|---|---|---|---|
| 2,756,494 | 7/1956 | Sejournet | 72—42 |
| 2,810,478 | 10/1957 | Sejournet | 72—42 |
| 3,072,251 | 1/1963 | Sauve | 72—42 |
| 3,254,401 | 6/1966 | Dalton | 72—42 |

OTHER REFERENCES

Paret: "Stainless-Steel Extrusions," p. 116, Machine Design, vol. 31, No. 1, Jan. 8, 1959, pub. by Penton Pub. Co., Cleveland, Ohio.

CHARLES W. LANHAM, *Primary Examiner.*

K. C. DECKER, *Assistant Examiner.*